US007845572B2

(12) United States Patent
Wicker et al.

(10) Patent No.: US 7,845,572 B2
(45) Date of Patent: Dec. 7, 2010

(54) SOLID-COLOR EMBEDDED SECURITY FEATURE

(75) Inventors: David Michael Wicker, Dansville, NY (US); Michael Scott Caton, Oakfield, NY (US)

(73) Assignee: Document Security Systems, Inc., Rochester, NY (US)

( * ) Notice: Subject to any disclaimer, the term of this patent is extended or adjusted under 35 U.S.C. 154(b) by 724 days.

(21) Appl. No.: 11/740,696

(22) Filed: Apr. 26, 2007

(65) Prior Publication Data

US 2007/0248364 A1  Oct. 25, 2007

Related U.S. Application Data

(63) Continuation-in-part of application No. 11/495,900, filed on Jul. 31, 2006.

(60) Provisional application No. 60/794,826, filed on Apr. 26, 2006, provisional application No. 60/703,860, filed on Aug. 1, 2005.

(51) Int. Cl.
*G06K 19/06* (2006.01)
(52) U.S. Cl. .................. 235/494; 235/462.04; 235/487
(58) Field of Classification Search .............. 235/494, 235/462.04, 487; 428/195.1, 207, 211.1; 358/1.9, 515, 518, 527; 283/81, 72, 74, 91, 283/93, 114, 94
See application file for complete search history.

(56) References Cited

U.S. PATENT DOCUMENTS 5,074,596 A * 12/1991 Castagnoli ................. 283/91

(Continued)

FOREIGN PATENT DOCUMENTS

CA     2207127    12/1997

(Continued)

OTHER PUBLICATIONS

Phillips, George K., "Combining Nanocharacter Printing, Digital Watermarking and UV Coded Taggents for Optimal Machine-Readable Security", Optical Security and Counterfeit Deterrence Techniquies IV, Jan. 24, 2002, pp. 150-158, vol. 4677.

(Continued)

*Primary Examiner*—Karl D. Frech
(74) *Attorney, Agent, or Firm*—Stephen B. Salai, Esq.; Thomas B. Ryan, Patent Agent; Harter Secrest & Emery LLP

(57) ABSTRACT

A latent image is incorporated into an apparent solid-color background for representing a desired solid-color background having a target color. An underlying solid-color background is printed on a print medium using a first color composition that differs from the target color. Line-screen patterns embedding a latent image in a visually integrated setting are printed over the solid-color background using a second color composition that differs from both the first color composition and the target color. The visual characteristics of the line-screen patterns forming the latent image and the visually integrated setting are matched for rendering the latent image practically indistinguishable from the visually integrated setting without a visual aid. The print densities of the line-screen patterns and the first and second color compositions are interrelated so that the line-screen patterns in combination with the underlying solid-color background produce the apparent solid-color background in the target color.

41 Claims, 2 Drawing Sheets

U.S. PATENT DOCUMENTS

| | | | |
|---|---|---|---|
| 5,149,140 | A | 9/1992 | Mowry et al. |
| 5,171,040 | A | 12/1992 | Orndorff |
| 5,297,815 | A | 3/1994 | Anderson |
| 5,487,567 | A | 1/1996 | Volpe |
| 5,707,083 | A | 1/1998 | Wallace |
| 5,708,717 | A | 1/1998 | Alasia |
| 5,788,285 | A | 8/1998 | Wicker |
| 6,000,728 | A | 12/1999 | Mowry |
| 6,104,812 | A | 8/2000 | Koltai et al. |
| 6,209,922 | B1 | 4/2001 | Klein |
| 6,305,718 | B1 | 10/2001 | Kendrick |
| 6,692,030 | B1 | 2/2004 | Phillips |
| 6,865,001 | B2 | 3/2005 | Long et al. |
| 6,966,998 | B1 | 11/2005 | Spowart |
| 2003/0030271 | A1 | 2/2003 | Wicker |
| 2005/0225080 | A1 | 10/2005 | Wicker |
| 2007/0029394 | A1 | 2/2007 | Wicker |

FOREIGN PATENT DOCUMENTS

| | | |
|---|---|---|
| DE | 3602563 C1 | 4/1987 |
| DE | 19518228 A1 | 11/1996 |
| EP | 0204552 A2 | 10/1986 |
| EP | 0328173 A1 | 8/1989 |
| EP | 0490457 A1 | 6/1992 |
| EP | 0789270 A1 | 8/1997 |
| FR | 2622840 A1 | 5/1989 |
| GB | 1344866 | 1/1974 |
| GB | 1434907 | 5/1976 |
| GB | 2217258 | 10/1989 |
| GB | 2217258 A | 10/1989 |
| GB | 1138011 | 3/2008 |
| JP | 2002/135479 | 5/2002 |
| WO | 9008046 A1 | 7/1990 |
| WO | WO 90/08046 | 7/1990 |
| WO | 9322145 A1 | 11/1993 |
| WO | WO 03/013870 A3 | 2/2003 |
| WO | WO 93/22145 | 11/2003 |
| WO | WO 2004/033229 A2 | 4/2004 |
| WO | WO 2004/068421 A2 | 8/2004 |
| WO | 2004110773 A1 | 12/2004 |
| WO | WO 2004/110773 A1 | 12/2004 |
| WO | WO 2006/001793 A1 | 1/2006 |
| WO | WO 2006/029033 A2 | 3/2006 |
| WO | WO 2007/016536 A2 | 8/2006 |

OTHER PUBLICATIONS

Spannenburg, S., "Modulation of Printed gratings as a Protection Against Copying", Optical Document Security, 1994, pp. 127-143, Chapter 7, ed. Rudolf L. van Renesse, Artech House, Inc., Boston.

Van Renesse, Rudolf L., "Noniridescent Optically Variable Devices," Optical Document Security, 1994, pp. 297-316, Chapter 15, ed Rudolf L. van Renesse, Artech House, Inc., Boston.

Wilson, Carla, "Plastic cash promotes Island projects," Times Colonist, Dec. 4, 2003.

Adler Tech International, Power Point slide presentation, "2002 Demo", alleged to have bee shown to numerous parties from Apr. 2003 to Aug. 2003.

2002 Check Scan/Verification Demo.

Adler Tech International, Inc., "The World of Private Currency, HALO Covert Features," at www.adlertech.com. 2006.

Adler Tech International, Inc., "When Failure is Not an Option, College of Physicians & Surgeons," at www.adlertech.com. 2006.

International Search Report, PCT/US2004/001360, mailed Nov. 23, 2004.

International Search Report, PCT/US2005/031440, mailed Apr. 27, 2006.

Central European Bank: "50 euro note" Data European Community, XX, XX, No. v1457742291, Jan. 1, 2002.

International Search Report, PCT/US2003/032159, mailed Mar. 9, 2004.

International Search Report, PCT/US2004/014517, mailed Aug. 10, 2004.

Adler Tech International, Inc., "When Failure if Not an Option, Guardian Angel," at www.adlertech.com. 2006.

International Search Report, PCT/US2007/067657, mailed Dec. 11, 2007.

* cited by examiner

SOLID-COLOR EMBEDDED SECURITY FEATURE

CROSS-REFERENCE TO RELATED APPLICATIONS

This application is a continuation-in part of U.S. patent application Ser. No. 11/495,900, filed Jul. 31, 2006, which claims priority from U.S. Provisional Patent Application No. 60/703,860, filed Aug. 1, 2005, and U.S. Provisional Patent Application No. 60/794,826, filed Apr. 26, 2006. All of these prior applications are hereby incorporated by reference.

TECHNICAL FIELD

This invention relates generally to protection methods and products for print media. More specifically, the present invention relates to hiding information or security images within documents or other print media, particularly against solid-color backgrounds and to revealing the hidden information or security images with an optical aid for such purposes as verification or authentication.

BACKGROUND OF THE INVENTION

Secure documents have been produced in the past by letterpress, offset, and intaglio printing processes, including such processes adapted for embedding hidden information or security images. The information or security images, often referred to as latent images, are printed so as to be effectively invisible to the unaided eye, but can be detected by using various optical enhancements.

Such latent images can be produced by embedding one line-screen pattern within another line-screen pattern. Each of the line-screen patterns can be formed by an array of print elements, such as dots, dashes, line segments, or other elemental shapes, in an arrangement of systematically spaced lines. The two line-screen patterns can be formed so as to be indistinguishable from one another to the naked eye, but can differ in some respect that can be optically exploited for viewing the latent image. For example, the two line-screen patterns can be printed in the same color and at the same print density but can differ in orientation or line frequency.

A first line-screen pattern can be printed in defined areas having one or more shapes for forming the latent image. A second line-screen pattern can be printed throughout an adjoining or an enlarged area forming a visually integrated setting, such as a complementary background or a remaining portion of a composite image. Each of the two line patterns can be formed by a plurality of line patterns in different colors so long as the multiple line patterns that form the latent image match the color and overall appearance of the one or more line patterns that form the visually integrated setting.

Other developments for purposes of providing document protection are disclosed in the patent literature, as for example, in U.S. Pat. No. 5,018,767 issued May 28, 1991; U.S. Pat. No. 5,193,853 issued Mar. 16, 1993; and U.S. Pat. No. 3,675,948 issued Jul. 11, 1972; and U.S. Pat. No. 4,143,967 issued Mar. 13, 1979, all to Ralph C. Wicker. All of these patents, which are hereby incorporated by reference, disclose various means for providing methods and products to enable copies of documents to be distinguished from the originals, as for example, by a "large dot-small dot pattern", a "close line-spaced pattern", and images or indicia which are screen printed at minutely varied spaces and/or angles on the originals and are intended to produce a highly visible moire pattern effect on the unauthorized copies. In this specification, the words "print", "printed" and "printing" are used to refer to the making of an original document by any of a number of known printing means, including transferring images from one source to another, typically a paper medium, using a transfer agent such as ink or toner. The words "copy" and "copying" are used to refer to making copies from an original printed document.

Additionally, the need exists for incorporating hidden information or security images in solid-color printed areas of print media, including documents and product packaging. Artwork designs for product packaging often contain solid-color areas that are readily visible but devoid of any printed security. Solid-color backgrounds, including luminosities below 50 percent (i.e., the darker solids), can be overprinted with contrasting color graphic or textual information. However, the addition of any screen line printing for embedding security images would have the effect of changing the perceived color of the background. Such background colors, especially as applied to product packaging or other promotional materials, have often developed customer associations, and any departure from the intended background colors is undesirable.

SUMMARY OF THE INVENTION

The invention, among one or more of its embodiments, prints latent images over modified solid-color backgrounds in at least partially contrasting inks for achieving a combination of colors that match an originally intended color of a desired solid-color background. The latent images can be printed together with their visually integrated settings overlying the modified solid-color backgrounds so as to be effectively indistinguishable from their settings, despite contrasting in color against the modified solid-color backgrounds. The latent images and their visually integrated settings can have the same apparent color and print density but preferably differ in some less obvious way so as to be distinguishable through the use of an optical aid. The modified solid-color backgrounds can be modified in color within regions of overlap with the latent images and their settings so that the overlapped solid-color backgrounds together with the latent images and their settings exhibit the originally intended color of the desired solid backgrounds.

Solid-color backgrounds of product packaging or other print media, having acquired a degree of marketplace recognition, can be exploited as locations for embedding latent images, such as hidden security images, without altering the recognizable color of the solid-color backgrounds. The latent images and their visually integrated settings can be printed with line-screen patterns having a color and a print density related to the color and percent reduction of a color component of the modified solid backgrounds. The color component removed from the solid-color backgrounds as a part of the original color mix can be printed in the line-screen patterns at print densities that restore the original percentage of the removed color component within the areas of the modified solid-color background overprinted by the line-screen patterns.

The line-screen patterns of the latent images and their visually integrated settings match each other in obvious visual respects, such as having the same color and print density. However, the line-screen patterns of the latent images and the visually integrated settings differ in at least one less obvious visual respect, so that the latent images can be distinguished from their visually integrated settings through use of an optical aid. For example, the line-screen patterns can differ in line frequency or in orientation angle.

The lines of the line-screen patterns are composed of print elements, such as dots, dashes, line segments, or other elemental shapes, and are arranged in arrays of systematically spaced lines. The print elements cover only limited portions of the solid-color backgrounds. Within spaces between the lines and within any spaces between the print elements along the lines, the modified solid background remains visible. The percent area of the modified solid background that is occluded by a color component of the printed lines of the line-screen patterns corresponds to the print density of the line-screen patterns.

The color components of the line-screen patterns can be drawn from one or more of the color components of an original color mix intended for printing the desired solid background color, such as a color on product packaging that has acquired some measure of marketplace association with a supplier. For printing modified solid-color backgrounds beneath these line-screen patterns, the original color mix of the solid-color backgrounds is modified, such as by removing from the mix a percentage of the one or more color components used for printing the line-screen patterns. For example, the composite color of the print elements of the line-screen patterns can be matched to the composite color of the components removed from the original color mix, and the print density of the print elements of the line-screen patterns can be matched to the percent of the original color mix represented by the color components removed from the original color mix.

The combination of the solid-color background printed with the reduced color mix and the line-screen patterns printed in the color reduced from the original color mix at print densities matching the percent reduction of the original mix presents to the eye of an observer an apparent solid-color background in the desired color. However, the apparent solid-color background includes line-screen patterns within which latent images containing additional graphics or information are embedded. The latent images are particularly useful as security images for verifying the authenticity of the underlying printed media.

Alternatively, the same component colors in different percentage mixes could also be used for both the modified solid-color background and the overlying line-screen patterns. For matching the intended color of the desired solid-color background, the color mix of the print elements within the line-screen patterns can be varied along with the density at which they are printed. Multiple line-screen patterns in different colors can be used so long as the latent images remain hidden (as visually indistinguishable from their visually integrated settings) and the percentage of each color component visible in the apparent solid-color background matches the original color mix of the desired background color.

Differences in the orientation or construction of the line patterns can be used to distinguish the latent images from their visually integrated settings with the visual aid, and differences between the color of the line patterns and the color of the underlying solid-color background can be used for distinguishing the latent images from the underlying solid-color background using the same or an additional visual aid. The latent images, which are practically invisible to the naked eye (e.g., effectively indistinguishable from their visually integrated settings), can be embedded in the apparent solid-color areas of print media but revealed for verification or authentication purposes through use of a matching viewing device. The desired color of the solid-color background can be maintained despite the addition of the embedded latent images. However, characteristics of the screen patterns, such as line frequency, and characteristics of the underlying solid-color background, such as luminosity, can be arranged so that upon reproduction, such as by copying or scanning, the latent images either (a) become visible or (b) drop out as indistinguishable from their visually integrated setting or underlying solid-color background. The ability to see the latent image over the solid-color background without a visual aid or the inability to see the latent image with the same visual aid could be used as indications of unauthorized copying.

One version of the invention involves a method of incorporating a latent image in an apparent solid-color background for representing a desired solid-color background having a target color. An underlying solid-color background is printed on a print medium using a first color composition that differs from the target color. Line-screen patterns are printed on the print medium over an area in common with the solid-color background embedding a latent image in a visually integrated setting using a second color composition that differs from both the first color composition and the target color. Visual characteristics of the line-screen patterns forming the latent image and the visually integrated setting are matched for rendering the latent image practically indistinguishable from the visually integrated setting without a visual aid. Print densities of the line-screen patterns and the first and second color compositions are interrelated so that the line-screen patterns in combination with the underlying solid-color background produce the apparent solid-color background in the target color.

The target color can be represented by a target combination of color components, and the first and second color compositions can be drawn from the target combination of color components. Preferably, each of the color components of the target combination of color components is exposed in the apparent solid-color background in a similar percentage as in the target combination of color components.

For example, the first color composition of the underlying solid-color background can contribute to the target combination of color components in the apparent solid-color background in accordance with the percent departure of the print density from 100 percent, and the second color composition of the line-screen patterns can contribute to the target combination of color components in the apparent solid-color background in accordance with the print density. A percent "$TB_{C_1}$" of a color component of the target combination of color components can be matched by the percent "$UB_{C_1}$" of the same color component in the first color composition of underlying solid-color background and the percent "$LS_{C_1}$" of the same color component in the second color composition of the overlying line-screen patterns in accordance with the print density "PD" of the line-screen patterns as follows:

$$TB_{C_1} = (100 - PD) * UB_{C_1} + PD * LS_{C_1}$$

The first color composition of the underlying solid-color background can also be defined by a percent reduction of the color components of the target combination of color components and the print density of the line-screen patterns matches this percent reduction. The target color can be defined as a combination of color components of the Pantone Matching System, and each of the first and second color compositions can include one or more of the Pantone Matching System color components of the target combination of color components.

The visual characteristics of the line-screen patterns of the latent image and the visually integrated setting can be matched in both color and print density. However, other characteristics of the line-screen patterns are preferably differentiated so that the latent image can be distinguished from the visually integrated setting with a visual aid. For example, the line-screen patterns of the latent image and the visually integrated setting can differ by at least one of line frequency and relative angular orientation. The visual aid can have a line-screen pattern having a line frequency matching a line frequency of at least one of the line-screen patterns.

Another version of the invention involves a print medium having an apparent solid-color background in a target color containing a latent image. An underlying solid-color background has a first color composition that differs from the target color. A latent image and a visually integrated setting are printed over an area in common with the underlying solid-color background as line-screen patterns having a second color composition that differs from both the target color and the first color composition. The latent image is practically indistinguishable from the visually integrated setting without a viewing aid. The line-screen patterns of the latent image and the visually integrated setting have a limited print density so that at least some of the underlying solid-color background is visible through the line-screen patterns. The combination of (a) the first color composition of the underlying solid-color background that is visible through the line-screen patterns and (b) the second color composition of the line-screen patterns produce the apparent solid-color background in a target color.

Preferably, the line-screen patterns of the latent image and the visually integrated setting have a matching print density. The line-screen patterns of the latent image and the visually integrated setting also preferably have a matching color composition.

The target color can be defined by a combination of color components and each of the first and second color compositions can include one or more color components of the target combination of color components. Preferably, each of the color components of the target combination of color components is exposed in the apparent solid-color background in a similar percentage as in the target combination of color components.

The color components of the target combination of color components are preferably color components of the Pantone Matching System, and each of the first and second color compositions can include one or more of the Pantone Matching System color components of the target combination of color components. The apparent solid-color background formed by the combination of the line-screen patterns and the underlying solid-color background has a preferred luminosity of no more than 50 percent.

Another version of the invention as a targeted solid-color printing system with covert imaging includes a targeted color and a substrate printed with line-screen patterns having a first color over a solid-color background having a second color. A first of the line-screen patterns embeds a latent image within a visually integrated setting formed by a second of the line-screen patterns. The line-screen patterns are arranged with a limited print density to form together with the solid-color background an uninterrupted tint in the targeted color.

The first and second line-screen patterns are preferably sufficiently similar so that the latent image is not readily distinguishable from the visually integrated setting without use of a visual aid. The line-screen patterns can be arranged with line frequencies that cause the line-screen patterns to drop out as indistinguishable from the solid-color background upon conventional digital reproduction. For this purpose, preferred line frequencies of the first and second line-screen patterns are both around 180 lines per inch. The combination of the line-screen patterns and the solid-color background can also be arranged with a luminosity of no more than 50 percent, so that upon conventional digital reproduction, the line-screen patterns are not reproduced in a color different from the solid-color background. Alternatively, the screen patterns can be arranged with differing line frequencies that cause the latent image to become visible apart from both its visually integrated setting and the solid-color background upon conventional digital reproduction.

The targeted color can differ from of both the first color of the solid-color background and the second color of the line-screen patterns. Alternatively, the targeted color can match both the first color of the solid-color background and the second color of the line-screen patterns. As such, the line-screen patterns can vary in height on the substrate with respect to the solid-color background to provide a way of revealing the latent image with a visual aid.

The visual aid for purposes of distinguishing the latent image from both its visually integrated setting and the underlying solid-color background can be an at least partially transmissive viewing device incorporating a pattern matching one of the line-screen patterns. Preferably, the pattern incorporated into the viewing device substantially matches a line frequency of one of the line-screen patterns. For example, when held in a substantially flat position against the printed substrate, the viewing device can be arranged to reveal the latent image apart from both its visually integrated setting and the underlying solid-color background. The viewing device is preferably formed as an optical plate made from glass or plastic, but could also be formed as a lens, such as for magnifying the line-screen patterns. Multiple viewing areas with different patterns can be incorporated into the viewing device to reveal latent images encoded in different line frequencies.

Yet another version of the invention features a targeted solid-color print medium matching a targeted color having luminosity no greater than 50 percent. A substrate is printed with at least one line-screen pattern having a first color over a solid-color background having a second color. The line-screen pattern has a line frequency of at least 120 lines per inch and a limited print density so as to form together with the solid-color background an uninterrupted tint in the targeted color at the target color luminosity of no more than 50 percent.

The line-screen pattern can have a sufficiently high line frequency such that, in combination with the target color luminosity of no more than 50 percent, the line-screen patterns are not reproduced in a color different from the solid-color background upon conventional digital reproduction. Preferably, the line-screen pattern has a line frequency of approximately 180 lines per inch.

Visible graphic information can be printed over the solid-color background or over both the solid-color background and the line-screen pattern. The visible information is preferably printed in a different color than the target color.

The line-screen pattern can be a first of two or more line-screen patterns, and a first of the line-screen patterns can embed a latent image within a visually integrated setting formed by a second of the line-screen patterns. The first and second line-screen patterns are preferably sufficiently similar so that the latent image is not readily distinguishable from the visually integrated setting without use of a visual aid.

The line-screen patterns can be arranged with line frequencies that cause the line-screen patterns to drop out as indistinguishable from the solid-color background upon conventional digital reproduction. Preferably, the line frequencies of first and second line-screen patterns are both around 180 lines per inch.

The target color can be defined by a combination of color components, and each of the first and second colors can include one or more color components of the target combination of color components. Each of the color components of the target combination of color components is preferably exposed in the uninterrupted tint in the target color in a similar percentage as in the target combination of color components.

BRIEF DESCRIPTION OF THE DRAWING FIGURES

Figure 1:
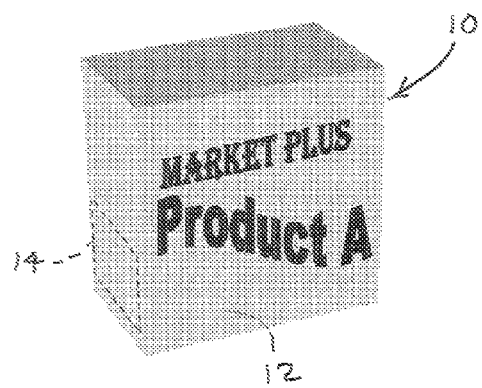
FIG. 1 is a perspective view of a product package having a solid color that has acquired or is intended for acquiring marketplace recognition associating the product with a particular supplier.
Figure 3:
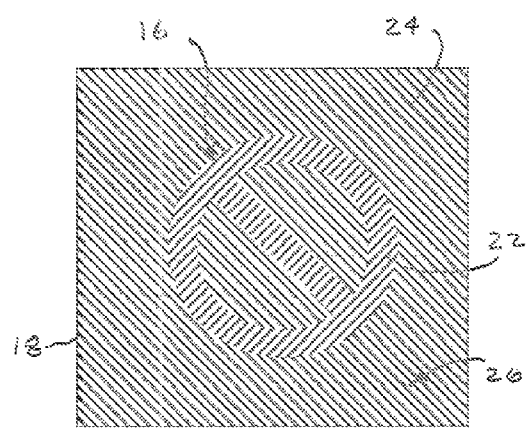

FIG. 3 shows the sample section of the package from FIG. 1 modified according to a separate second step of the invention involving printing line-screen patterns in a common color that embed a latent image in a visually integrated setting. The line frequencies of the line-screen patterns are significantly reduced for purposes of illustration so that the latent image and its visually integrated setting are distinguishable similar to the effect of a magnification of the line frequencies.

Figure 4:
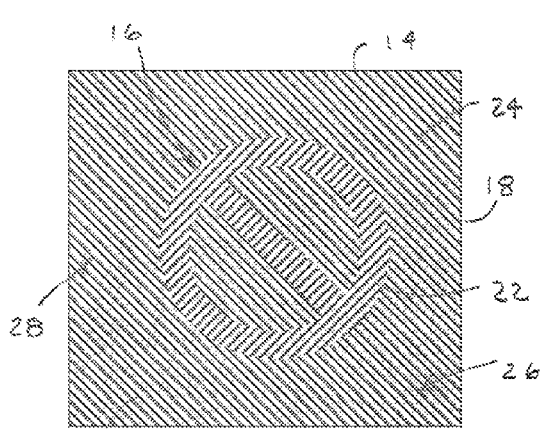

FIG. 4 shows the solid-color background overprinted by the two line-screen patterns for effectively matching the target solid color of the package.

Figure 5:
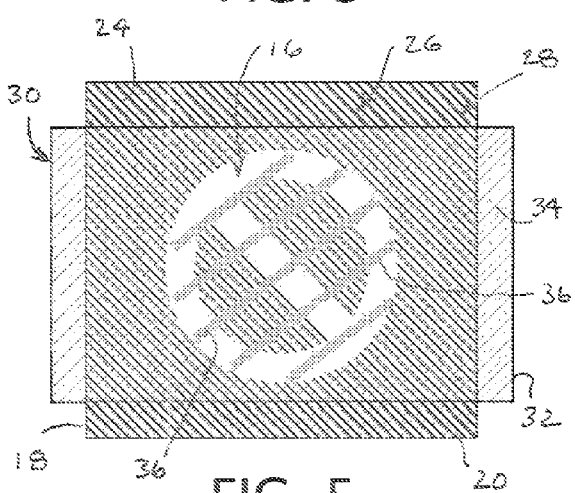

FIG. 5 shows a viewing device overlying the modified section of the package for revealing the otherwise hidden latent image.

Figure 6:
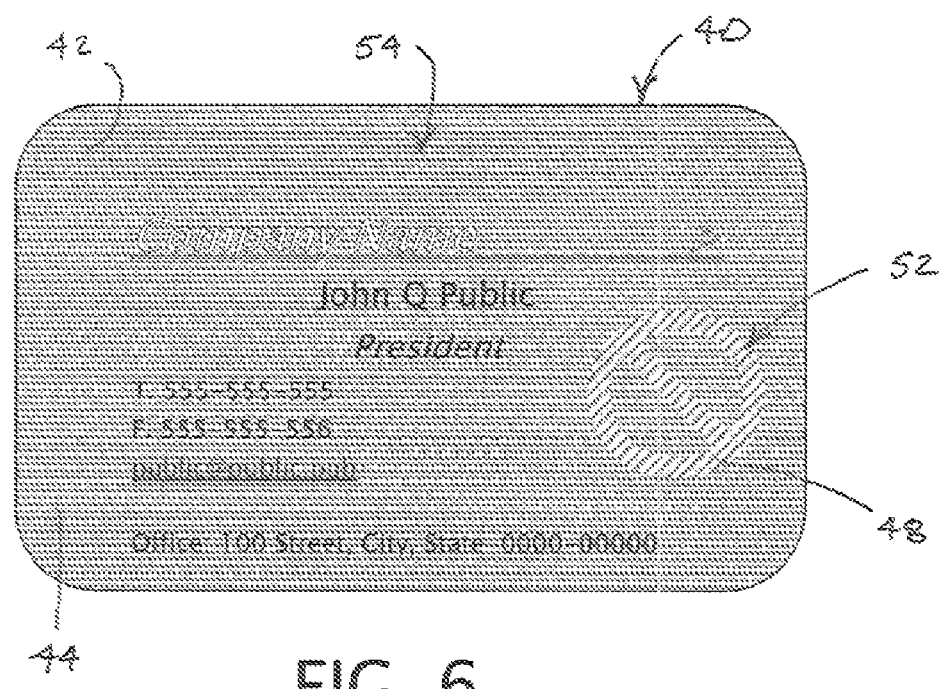

FIG. 6 is a front view of a business card in which a target background tint is formed by a high frequency line-screen pattern printed over a solid-color background. A latent image is embedded in a portion of the high-frequency line-screen pattern.

DETAILED DESCRIPTION OF THE INVENTION

A product package 10 is depicted in FIG. 1 having a solid-color background 12 that is intended for associating the packaged product with its supplier. Most if not all of the supplier's products are marketed in packaging with a similar color scheme. A region 14 of the solid-color background 12 modified in accordance with this invention is presented in FIGS. 2-4 in various stages for incorporating a latent image 16 while preserving the intended color, now referred to as the target color, of the solid-color background 12.

Figure 2:
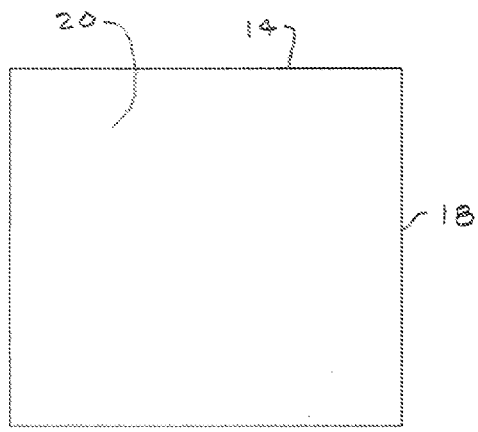
FIG. 2 shows a sample section of the package from FIG. 1 modified according to one step of the invention involving printing a solid-color background for reproducing the solid color of the packaging illustrated in FIG. 1 while incorporating hidden information.

With the product packaging 10 considered as an example of a print medium 18, FIG. 2 depicts the region 14 of the print medium 18 printed with a modified solid-color background 20 using a first color composition that differs from the target color. FIG. 3 depicts the same region 14 of the print medium printed with two matching line-screen patterns 22 and 24 using a second color composition that differs from both the first color composition and the target color. The line-screen pattern 22 forms the latent image 16, which is embedded in a visually integrated setting 26 formed by the line-screen pattern 24.

Visual characteristics of the two line-screen patterns 22 and 24 are matched for rendering the latent image 16 practically indistinguishable from its visually integrated setting without a visual aid. For example, both line-screen patterns can be of the same color and print density. The same or different line frequencies can be used, but preferably, both frequencies are at least 120 lines per inch so that the line-screen patterns 22 and 24 appear as an uninterrupted tint.

However, one or more less obvious characteristics of the line-screen patterns 22 and 24 can be used to differentiate the two patterns 22 and 24 so that the latent image 16 can be detected by a visual aid, such as a magnifier or reader. For example, as illustrated in FIGS. 3 and 4, the line-screen patterns 22 and 24 are oriented orthogonally. However, smaller angular of separations, such as angular differences as small as 5 degrees can be used to differentiate the patterns with a visual aid. Preferably, the lines of the two line-screen patterns, such as the line-screen patterns 22 and 24, intersect so that no gaps or local variations in print density are visible.

The lines of the line-screen patterns 22 and 24 are formed by arrays of print elements in various forms including dots, dashes, line segments, swirls, and other elemental shapes. Print density is defined as the percent of the printed area covered by the print elements. The remaining space of the printed area is located between the lines or between print elements along the lines.

FIG. 4 depicts the combination of the solid-color background 20 and the two line-screen patterns 22 and 24 as an apparent solid-color background 28 matching the target color. Preferably, the line-screen patterns 22 and 24 are not only visually indistinguishable from each other but also visually indistinguishable from the underlying solid-color background 20 so that the apparent solid-color background 28 appears as a single solid color. Higher frequency line-screen patterns 22 and 24, such as 120 lines per inch or more, and limited color contrast between the screen patterns 22 and 24 and the underlying solid-color background 20 contribute to the appearance of an undifferentiated solid color.

The solid-color background 20 underlies the line-screen patterns 22 and 24, and the line-screen patterns 22 and 24 are printed over the solid-color background 20 with a limited print density so that portions of the solid-color background 20 remain visible within the apparent solid-color background 28. The percent of the underlying solid-background color occluded by the line-screen patterns 22 and 24 is equal to the print density of the line-screen patterns 22 and 24.

The combined color of the line-screen patterns 22 and 24 and the visible portions of the solid-color background 20 within the apparent solid-color background 28 are arranged to match the target color so that the latent image 16, although printed in a different color, can be hidden within a the apparent solid-color background 28 while preserving the appearance of a solid-color background in the target color.

The target color can be defined as a combination of color components according to the Pantone Matching System. For example, a target color 294 on the Pantone Matching System Color Chart includes 8 parts reflex blue, 8 parts process blue, and 1 part black. Each of the blue components, in a ratio of 8 parts to 17 total parts, contributes approximately 47.06 percent of the color combination. The black component, as 1 part in 17, comprises approximately 5.88 percent of the original 294 color combination. The color can be modified to color 293 by removing the black component.

With a target of the 294 color, the underlying solid-color background 20 can be printed in the color 293 that includes equal parts reflex blue and process blue but no black. The overlying line-screen patterns 22 and 24 can be printed in black over the solid-color background 20 at a print density of approximately 5.88 percent to restore the same percentage of each of the original color components of the target color in the apparent solid-color background 28, such as appearing in FIG. 4.

With this new formulation, the underlying solid-color background is occluded by approximately 5.88 percent. Since the two blue components of the underlying solid-color background 20, namely process blue and reflex blue, each occupy the equivalent of 50 percent of the printed area of the underlying solid-color background 20, the exposed area of each the two blue components is reduced by approximately 2.94 percent. The percent area covered by the black component is equal to 5.88 percent. Thus, in the apparent solid-color background 28, the reflex blue and process blue components each occupy approximately 47.06 percent of the printed area and the black component occupies 5.88 percent of the area, restoring the original component percentages of the target 294 color.

With the underlying background printed with a first color composition containing one or more color components of the target color and the line-screen patterns 22 and 24 printed with a second color composition containing one or more color components of the target color, the individual color components of the target color can be achieved in their desired ratio according to the following relationship:

$$TB_{C1} = \frac{(100 - PD)}{100} * UB_{C1} + \frac{PD}{100} * LS_{C1}$$

where "$TB_{C1}$" is the desired percent of the color component in the target combination of color components, "$UB_{C1}$" is the percent of the same color component in the color composition of the underlying solid-color background 20, "$LS_{C1}$" is the percent of the same color component in the color composition of the overlying line-screen patterns 22 and 24, and "PD" is the print density of the overlying line-screen patterns 22 and 24.

As a further example, the underlying solid-color background 20 could be printed with a further modification of the target 294 color by removing 1 part process blue in addition to 1 part black, leaving 8 parts reflex blue and 7 parts process blue, the process blue now comprising only 46.67 percent of the underlying solid-color background 20. The line-screen patterns 22 and 24 can be printed with equal parts process blue and black. The desired percent "$TB_{C1}$" of process blue in the target color 294 remains approximately 47.06 percent. The percent "$UB_{C1}$" of process blue in the color composition of the underlying solid-color background 20 is approximately 46.67 percent. The percent "$LS_{C1}$" of process blue in the color composition of the line-screen patterns 22 and 24 is 50 percent. With a print density "PD" of approximately 11.76 percent, corresponding to the 2 part in 17 total parts reduction of the target color components in the color composition of the underlying solid-color background 20, the combination of the remaining visible portions of the underlying solid-color background 20 with the overprinted line-screen patterns 22 and 24 restores the desired percent "$TB_{C1}$" of process blue in the target color 294 in the apparent solid-color background 28 as follows:

$$47.06 = \frac{(100 - 11.76)}{100} * 46.67 + \frac{11.76}{100} * 50$$

According to the same ratios, the black component is similarly restored to its intended value of 5.88 percent of the target color composition as follows:

$$5.88 = \frac{(100 - 11.76)}{100} * 0 + \frac{11.76}{100} * 50$$

The same target color components can be arranged in different combinations in both the underlying solid-color background 20 and the overprinted line-screen patterns 22 and 24. The latent image 16 and the multiple line-screen patterns of different densities and color compositions can be used to form both the latent image 16 and its visually integrated setting 26 to support other color combinations with the underlying solid-color background 20 to match the target color.

FIG. 5 depicts a viewing aid in the form of a transmissive viewing device 30 that overlies the apparent solid-color background 28 for revealing the latent image 16. The viewing device 30, which is shown in the form of a plate 32 can have a line-screen pattern 34 with a line frequency that matches or forms an integer multiple or integer quotient of the line frequency of the line-screen pattern 22 of the latent image 16 or the line-screen pattern 24 of the visually integrated setting 24.

Preferably, the two line-screen patterns 22 and 24 have the same line frequency but are angularly oriented with respect to each other. Thus, the viewing device 30 can be rotated into a position of substantial alignment with one of the line-screen patterns 22 or 24 to effectively remove the aligned line-screen pattern from view, thereby revealing either a positive or a negative image of the latent image 16.

The viewing device 30 can be held against the print medium 18 and rotated for either removing one or the other of the line-screen pattern 22 or 24 for exposing the latent image 16 in contrast with its otherwise visually integrated setting 26. As the viewer 30 is rotated into alignment with one of the line-screen patterns 22 or 24, interfering fringes 36 between the line-screen pattern 34 of the viewer 30 and the underlying line-screen patterns 22 or 24 of the apparent solid-color background 28 progressively reduce in number and can disappear entirely if the matching frequencies are perfectly aligned.

The viewing device 30 is depicted as an unpowered plate 32 made of plastic, glass, film or other optically transmissive material. However, the viewing device 30 could also be formed of as a lens, preferably with magnifying power. The line-screen pattern 34 can be printed or embossed in the plate 32, such as by silkscreen printing or laser burning. The plate 32 can be clear, tinted, or lined to assist the viewing of the latent image 16 and can contain several distinct areas for viewing of multiple screened background areas.

The latent image 16 is especially useful as a hidden security feature for authenticating the print medium 18 to which it is applied. The feature can be visually indistinguishable from a solid-color background, but can be revealed with a visual aid.

The line-screen patterns 22 and 24 together with the underlying solid-color background can be arranged to resist digital reproduction by conventional copying or scanning. For example, the line frequencies of the line-screen patterns 22 and 24 can be sufficiently high in relation to the resolution limits for conventional digital reproduction that the line-screen patterns 22 and 24 are not reproduced as line structures distinct from the underlying solid-color background. In other words, the apparent solid-color background 28 is reproduced as if it were a single color. The absence of a discernable latent image 16 under magnification or matching viewing device can be construed as evidence of unauthorized copying of the product package 10. Line frequencies of approximately 180 lines per inch are especially preferred for this purpose. Lower line frequencies in combination with lower overall luminosity of the apparent solid-color background 28 can have a similar result. Luminosities no greater than 50 percent are preferred for producing undifferentiated single-color copies of the apparent solid-color background 28.

Alternatively, the line frequencies of the line-screen patterns 22 and 24 can differ to produce different results upon digital reproduction. For example, the line frequency of the line-screen pattern 22 of the latent image 16 can be substantially less than the line-screen pattern 24 of its visually integrated setting 26. Line width or other dimensions of print element size can be adjusted between the line-screen patterns of differing line frequencies to maintain a common print density. Upon reproduction, the line-screen pattern having the higher line frequency, e.g., the visually integrated setting 26, can drop out as an indistinguishable part of the solid-color background, while the line-screen pattern having the lower line frequency, e.g., the latent image 16, can be faithfully reproduced as a visually distinguishable image from both its visually integrated setting 26 and the underlying solid-color background 20. The appearance of the latent image in the reproduction can also be construed as evidence of unauthorized copying of the product package 10.

FIG. 6 discloses an alternative print medium in the form of a business card 40. Like the product package 10, the business card 40 has a target color that is faithfully reproduced by the combination of an underlying solid-color background 42 and an overlying line-screen pattern 44 as taught in the preceding embodiment.

The line-screen pattern 44 extends horizontally across the card 40. For authentication and verification purposes, the line-screen pattern 44 has a line frequency of at least 120 lines per inch, and together with the underlying solid-color background, produces an apparent solid-color background 46 having a luminosity of 50 percent or less. This combination is intended for thwarting unauthorized reproductions of the card 40.

Upon conventional digital reproduction, such as copying or scanning, the line-screen pattern 44 is not reproduced with a line structure distinct from the underlying solid-color background. Although the card 40 can be reproduced in the target color by conventional copy means, the absence of the line-screen pattern 44 as distinct from the underlying solid-color background 42 can be construed as evidence of unauthorized copying. In an authentic card 40, the line structure of the line-screen pattern 44 can be discerned with the aid of a magnifier or a viewing device with a matching line-screen pattern.

As also apparent in FIG. 6, a second line-screen pattern 48 is embedded within the first line-screen pattern 44. The second line-screen pattern 48 has the form of a latent image 52 that is intended to be practically indistinguishable from the remaining line-screen pattern 44 that functions in this context as a visually integrated setting 54. The two line-screen patterns 44 and 48 can be rendered visually indistinguishable by printing the two line-screen patterns 44 and 48 in the same color and at the same print density. Higher frequency line-screen patterns of 120 lines per inch or more are also generally more difficult to discern as line patterns, especially if limited in color contrast with the underlying solid-color background 42. However, a viewing aid, such as the viewing device 30 of FIG. 5, can be used to distinguish the line-screen pattern 48 of the latent image 52 from the line-screen pattern 44 of its visually integrated setting 54.

The invention can be carried out on various print media using a variety of substrate materials and inks or other coloring agents. For example, the print media can include, paper, film, or foil substrates and laminates. The underlying solid background can be printed with ink or otherwise colored such as by using a colored paper substrate. Covert information can be most effectively concealed within latent images through the use of dark or metallic colors, including metallic inks for either or both of the line-screen patterns or the underlying solid-color background.

The latent image can be composed of two or more line-screen patterns, which together incorporate a color combination found in a single line-screen pattern of the visually integrated setting. The combined line-screen patterns of the latent image can be matched in both color and print density to a single line-screen pattern of the visually integrated setting. Opposite or different combinations of line-screen patterns between the latent image and its visually integrated setting are also possible, including overlapping line-screen patterns in the same or different colors. The line-screen patterns of the latent image and its visually integrated setting are most effectively matched using print elements of equal size and shape. However, the print elements can differ between the line-screen patterns at a common print density as another way of distinguishing between the line-screen patterns with a visual aid.

Although the line-screen patterns are referred to herein as being printed over the underlying solid-color background, the line-screens and solid-color background can be printed in any order. For example, the line-screen patterns can be printed first against a transparent substrate and the solid-color background can be printed next on top of the line-screen patterns. However, from a view through the transparency, the line-screen patterns still overly the solid-color background.

Although the invention has been described in conjunction with specific embodiments thereof, it is evident that many alternatives, modifications and variations that fall within the spirit and broad scope of the appended claims.

The invention claimed is:

1. A method of incorporating a latent image in an apparent solid-color background for representing a desired solid-color background having a target color comprising steps of
   printing an underlying solid-color background on a print medium using a first color composition that differs from the target color,
   printing line-screen patterns on the print medium over an area in common with the solid-color background embedding the latent image in a visually integrated setting using a second color composition that differs from both the first color composition and the target color,
   matching visual characteristics of the line-screen patterns forming the latent image and the visually integrated setting for rendering the latent image practically indistinguishable from the visually integrated setting without a visual aid, and
   interrelating print densities of the line-screen patterns and the first and second color compositions so that the line-screen patterns in combination with the underlying solid-color background produce the apparent solid-color background in the target color.

2. The method of claim 1 in which the target color is represented by a target combination of color components, and the first and second color compositions are drawn from the target combination of color components.

3. The method of claim 2 in which the target combination of color components includes the color components having predetermined percentages within the target combination of color components and the first and second color compositions are exposed in the apparent solid-color background in similar percentages as the predetermined percentages of the color components within the target combination of color components.

4. The method of claim 2 in which the first color composition of the underlying solid-color background contributes to the target combination of color components in the apparent solid-color background in accordance with a percent departure of the print density from 100 percent, and the second color composition of the line-screen patterns contributes to the target combination of color components in the apparent solid-color background in accordance with the print density.

5. The method of claim 2 in which a percent "TBC1" of one of the color components of the target combination of color components is matched by a percent "UBC1" of the same color component in the first color composition of the underlying solid-color background and a percent "LSC1" of the same color component in the second color composition of the line-screen patterns in accordance with the print density "PD" of the line-screen patterns as follows:

$$TB_{C1} = \frac{(100-PD)}{100} * UB_{C1} + \frac{PD}{100} * LS_{C1}.$$

6. The method of claim 2 in which the first color composition of the underlying solid-color background is defined by a percent reduction of the color components of the target combination of color components and the print density of the line-screen patterns matches this percent reduction.

7. The method of claim 2 including a step of defining the target color as a combination of color components of the Pantone Matching System, and each of the first and second color compositions include one or more of the Pantone Matching System color components of the target combination of color components.

8. The method of claim 1 in which the step of matching visual characteristics of the line-screen patterns includes matching the line-screen patterns of the latent image and the visually integrated setting in both color and print density.

9. The method of claim 1 including a step of differentiating other characteristics of the line-screen patterns so that the latent image can be distinguished from the visually integrated setting with the visual aid.

10. The method of claim 9 in which the line-screen patterns of the latent image and the visually integrated setting differ by at least one of line frequency and relative angular orientation.

11. The method of claim 10 in which the visual aid includes a line-screen pattern having a line frequency matching a line frequency of at least one of the line-screen patterns.

12. A print medium having an apparent solid-color background in a target color containing a latent image comprising
an underlying solid-color background printed with a first color composition that differs from the target color,
a latent image and a visually integrated setting printed over an area in common with the underlying solid-color background as line-screen patterns having a second color composition that differs from both the target color and the first color composition,
the latent image being practically indistinguishable from the visually integrated setting without a viewing aid,
the line-screen patterns of the latent image and the visually integrated setting having a limited print density so that at least some of the underlying solid-color background is visible through the line-screen patterns, and
a combination of the first color composition of the underlying solid-color background that is visible through the line-screen patterns and the second color composition of the line-screen patterns producing the apparent solid-color background in the target color.

13. The print medium of claim 12 in which the line-screen patterns of the latent image and the visually integrated setting have a matching print density.

14. The print medium of claim 13 in which the line-screen patterns of the latent image and the visually integrated setting have a matching color composition.

15. The print medium of claim 12 in which the target color is defined by a combination of color components and each of the first and second color compositions include one or more color components of the target combination of color components.

16. The print medium of claim 15 in which each of the color components of the target combination of color components is exposed in the apparent solid-color background in a similar percentage as in the target combination of color components.

17. The print medium of claim 15 in which the first color composition of the underlying solid-color background contributes to the target combination of color components in the apparent solid-color background in accordance with the percent departure of the print density from 100 percent, and the second color composition of the line-screen patterns contributes to the target combination of color components in the apparent solid-color background in accordance with the print density.

18. The print medium of claim 15 in which a percent "TBC1" of one of the color components of the target combination of color components is matched by a percent "UBC1" of the same color component in the first color composition of the underlying solid-color background and a percent "LSC1" of the same color component in the second color composition of the overlying line-screen patterns in accordance with the print density "PD" of the line-screen patterns as follows:

$$TB_{C1} = \frac{(100-PD)}{100} * UB_{C1} + \frac{PD}{100} * LS_{C1}.$$

19. The print medium of claim 15 in which the first color composition of the underlying solid-color background is defined by a percent reduction of the color components of the target combination of color components and the print density of the line-screen patterns matches this percent reduction.

20. The print medium of claim 15 in which the color components of the target combination of color components are color components of the Pantone Matching System, and each of the first and second color compositions include one or more of the Pantone Matching System color components of the target combination of color components.

21. The print medium of claim 12 in which the apparent solid-color background formed by the combination of the line-screen patterns and the underlying solid-color background has a luminosity of no more than 50 percent.

22. A targeted solid-color printing system with covert imaging comprising
a targeted color,
a substrate printed with line-screen patterns having a first color over a solid-color background printed with a second color,
a first of the line-screen patterns embedding a latent image within a visually integrated setting formed by a second of the line-screen patterns, and the line-screen patterns being arranged with a limited print density to form together with the solid-color background an uninterrupted tint in the targeted color.

23. The printing system of claim 22 in which the first and second line-screen patterns are sufficiently similar so that the latent image is not readily distinguishable from the visually integrated setting without use of a visual aid.

24. The printing system of claim 23 in which the visual aid is an at least partially transmissive viewing device incorporating a pattern matching one of the line-screen patterns.

25. The printing system of claim 23 in which the line-screen patterns are arranged with line frequencies that cause the line-screen patterns to drop out as indistinguishable from the solid-color background upon conventional digital reproduction.

26. The printing system of claim 25 in which the line frequencies of the first and second line-screen patterns are both around 180 lines per inch.

27. The printing system of claim 23 in which the screen patterns are arranged with differing line frequencies that cause the latent image to become visible apart from both its visually integrated setting and the solid-color background upon conventional digital reproduction.

28. The printing system of claim 23 in which a combination of the line-screen patterns and the solid-color background has a luminosity of no more than 50 percent so that upon conventional digital reproduction, the line-screen patterns are not reproduced in a color different from the solid-color background.

29. The printing system of claim 22 in which the targeted color differs from of both the first color of the solid-color background and the second color of the line-screen patterns.

30. The printing system of claim 22 in which the targeted color matches both the first color of the solid-color background and the second color of the line-screen patterns and the line-screen patterns vary in height on the substrate with respect to the solid-color background.

31. The printing system of claim 22 in which the target color is defined by a combination of color components and each of the first and second colors includes one or more color components of the target combination of color components.

32. The printing system of claim 22 in which a percent "TBC1" of one of the color components of the target combination of color components is matched by a percent "UBC1" of the same color component in the first color of solid-color background and a percent "LSC1" of the same color component in the second color of the line-screen patterns in accordance with the print density "PD" of the line-screen patterns as follows:

$$TB_{C1} = \frac{(100 - PD)}{100} * UB_{C1} + \frac{PD}{100} * LS_{C1}.$$

33. A targeted solid-color print medium comprising
a targeted color having a luminosity no greater than 50 percent,
a substrate printed with at least one line-screen pattern having a first color over a solid-color background printed with a second color, and
the at least one line-screen pattern having a line frequency of approximately 180 lines per inch and a limited print density to form together with the solid-color background an uninterrupted tint in the targeted color at the target color luminosity of no more than 50 percent so that the at least one line-screen pattern is not reproduced as line structures distinct from the solid-color background upon conventional digital reproduction.

34. The print medium of claim 33 including visible graphic information printed over the solid-color background.

35. The print medium of claim 33 in which the visible graphic information is printed over both the solid-color background and the line-screen pattern.

36. The print medium of claim 33 in which the line-screen pattern is a first of two or more line-screen patterns, and a first of the line-screen patterns embeds a latent image within a visually integrated setting formed by a second of the line-screen patterns.

37. The print medium of claim 36 in which the first and second line-screen patterns are sufficiently similar so that the latent image is not readily distinguishable from the visually integrated setting without use of a visual aid.

38. The print medium of claim 37 in which the line-screen patterns are arranged with line frequencies that cause the line-screen patterns to drop out as indistinguishable from the solid-color background upon conventional digital reproduction.

39. The print medium of claim 38 in which the line frequencies of the first and second line-screen patterns are both around 180 lines per inch.

40. The print medium of claim 36 in which the target color is defined by a combination of color components and each of the first and second colors includes one or more color components of the target combination of color components.

41. The print medium of claim 40 in which each of the color components of the target combination of color components is exposed in the uninterrupted tint in the target color in a similar percentage as in the target combination of color components.

* * * * *